United States Patent
Andersson

(10) Patent No.: US 11,604,937 B2
(45) Date of Patent: Mar. 14, 2023

(54) SYSTEMS AND METHODS FOR ADAPTIVE DATA PROCESSING ASSOCIATED WITH COMPLEX DYNAMICS

(71) Applicant: Kåre L. Andersson, Svenshögen (SE)

(72) Inventor: Kåre L. Andersson, Svenshögen (SE)

(*) Notice: Subject to any disclaimer, the term of this patent is extended or adjusted under 35 U.S.C. 154(b) by 1327 days.

(21) Appl. No.: 15/948,045

(22) Filed: Apr. 9, 2018

(65) Prior Publication Data
US 2019/0311215 A1  Oct. 10, 2019

(51) Int. Cl.
G06K 9/62 (2022.01)
G06F 17/11 (2006.01)
G06N 7/00 (2006.01)
G06N 5/02 (2006.01)

(52) U.S. Cl.
CPC ............. *G06K 9/623* (2013.01); *G06F 17/11* (2013.01); *G06K 9/6262* (2013.01); *G06K 9/6288* (2013.01); *G06N 5/027* (2013.01); *G06N 7/005* (2013.01)

(58) Field of Classification Search
CPC .... G06K 9/623; G06K 9/6262; G06K 9/6288; G06F 17/11; G06N 7/005; G06N 3/08; G06N 3/126; G06N 5/003; G06N 20/00
See application file for complete search history.

(56) References Cited

U.S. PATENT DOCUMENTS 9,015,093 B1* 4/2015 Commons ............. B60W 30/00 706/26
9,875,440 B1* 1/2018 Commons ........... G01C 21/3602
2002/0199194 A1* 12/2002 Ali ........................ H04N 5/782 348/E7.071
2003/0225718 A1* 12/2003 Shmulevich ............. G16B 5/20 703/11
2005/0256844 A1* 11/2005 Cristol ................... G06Q 30/02
2007/0192170 A1* 8/2007 Cristol ............... G06Q 10/0639 705/7.23

(Continued)

OTHER PUBLICATIONS

Adaptive Co-Weighting Deep Convolutional Features for Object Retrieval Wang et al. (Year: 2018).*

(Continued)

*Primary Examiner* — Kakali Chaki
*Assistant Examiner* — Ababacar Seck
(74) *Attorney, Agent, or Firm* — April M. Mosby

(57) ABSTRACT

Systems and methods for adaptive data processing associated with complex dynamics are provided. The method may include applying the two or more predictive algorithms or rule-sets to an atomized model to generate applied data models. After receipt of inputs, the method may further include processing at least two propositions during a learning mode based upon detection of an absolute pattern within the applied data models; wherein propositions are action proposals associated with each predictive algorithm. At least two propositions may compete against each other through the use of an associated rating cell, which may be updated based upon the detected patterns. The method may further include processing propositions during an execution mode based upon detection of an absolute condition, wherein the rating cells are updated based upon these detected conditions. Further, these updated rating cells may be provided as feedback to update the atomized model.

20 Claims, 7 Drawing Sheets

(56) References Cited

U.S. PATENT DOCUMENTS

| | | | | |
|---|---|---|---|---|
| 2009/0254399 A1* | 10/2009 | Cristol | ................... | G06Q 30/02 |
| | | | | 705/7.36 |
| 2015/0056596 A1* | 2/2015 | Bercovitz | ................ | G09B 7/02 |
| | | | | 434/350 |
| 2017/0285008 A1* | 10/2017 | Nolan | ....................... | G16B 5/00 |

OTHER PUBLICATIONS

Building Fuzzy Systems by Soft Competitive Learning Nie et al. (Year: 1995).*

* cited by examiner

SYSTEMS AND METHODS FOR ADAPTIVE DATA PROCESSING ASSOCIATED WITH COMPLEX DYNAMICS

BACKGROUND

Predictive data processing and artificial intelligence are used to process a great variety of complex calculations necessary for systems having complex dynamics. For example, there is a large selection of data processing methods such as, feature keying, generic predictive algorithms, heuristics, meta-heuristics, Artificial Neural Networks (ANN) and the like. These data processing methods may be used to help discover new medical drugs, to perform broad financial modeling necessary for identifying trends and risk analysis, to handle large database searches and to perform massive calculations needed in many fields of science.

One problem with many of these predictive methods, however, is that they do not provide a completely accurate simulation. For example, when keying and/or hashed keying is implemented within a data processing system, the speed of processing large amounts of data diminishes over time; thereby, the simulation is often not synchronized in real-time. Further, when keying is used, a bit string can be used to represent a limited number of positions per feature, wherein the number of features must be within a certain range. Additionally, the discrete approach of keying only provides information that is strictly predetermined for all candidates combined. Although hashed keying may be implemented in lieu of keying, the density of bits set in a database associated therewith can be limiting. As a result, the risk of false positives rapidly increases and the value of information obtained per bit is lessened. Accordingly, the length of the bitstring for this approach must be long enough to support the intended average number of features times the average number of hash bits set for each key. Yet, multiple bits per feature requires more memory than for pure keying.

Regarding generic algorithms, these rely heavily upon stable conditions in order to function; yet, actual real-time data describing most systems are highly unstable. Thereby, most generic algorithms can require a lot of execution time, which causes a delay in obtaining results. This poses the problem of over-fitting. Generic algorithms are mostly complex in nature and are also strictly related to a certain type of problem. Further, the prerequisite knowledge necessary to implement such algorithms is highly detailed. Thereby, the user is forced to meet a high standard.

Approaches using heuristics or meta-heuristics are approximate in nature and do not promise global optimality. Heuristics requires specific knowledge about the problems investigated. Fine-tuning of the parameters associated with this approach is often a tedious task. In contrast, meta-heuristics does not guarantee the ability for repetitive calculations. Similar to heuristics, there exists a dependence upon fine-tuning and an uncertainty about the accuracy of each solution.

Regarding Artificial Neural Networks (ANN), substantial obstacles exist, wherein the complexity and the large number of parameters required in order to train a system make the process difficult. Even if ANN can be likened unto general algorithms, different setups are usually necessary for different types of problems. This may necessitate the use of alternative models for new cases. However, these networks are hard to retrain. ANN also requires a high level of computational resources, along with other auxiliary resources, such as, graphics cards for computing or the use of a mini-batch approach to deal with the substantial RAM issues that arise when using ANN.

It is within this context that the embodiments arise.

SUMMARY

Embodiments of a system and method for adaptive data processing associated with complex dynamics are provided. It should be appreciated that the present embodiment can be implemented in numerous ways, such as a process, an apparatus, a system, a device, or a method. Several inventive embodiments are described below.

In some embodiments, a system and method adaptive data processing associated with complex dynamics are provided. The method may include applying the two or more predictive algorithms or rule-sets to an atomized model to generate applied data models. After receipt of inputs, the method may further include processing at least two propositions associated with each predictive algorithm during a learning mode based upon detection of an absolute pattern within the models, wherein a proposition is an action proposal suggested by a particular predictive algorithm. At least two propositions may compete against each other through the use of at least one associated rating cell, which may be updated based upon the external feedback; wherein, each rating cell indicates a ranking of the proposition with respect to all others. The method may further include processing these propositions during an execution mode based upon detection of an absolute condition, wherein the rating cells are updated based upon these detected conditions. Further, these updated rating cells may be provided as feedback to update the atomized model. Thereby, a system can be modeled by adaptively processing existing models having smaller building blocks (atoms) based upon a select group of predictive algorithms, whereby propositions are ranked and selected for the best fit of the system whether during a learning sequence or during operation.

In some embodiments, a computing device is provided. The computing device may comprise a memory and a processor operable to conduct adaptive data processing associated with complex dynamics. In particular, the processor may be operable to apply the two or more predictive algorithms or rule-sets to an atomized model to generate applied data models. After receipt of inputs, the processor may be operable to process at least two propositions during a learning mode based upon detection of an absolute pattern within the applied data models; wherein propositions are action proposals associated with each predictive algorithm. Further, the processor may be operable to enable at least two propositions to compete against each other through the use of an associated rating cell, which may be updated based upon the detected patterns. The processor may be operable to further process propositions during an execution mode based upon detection of an absolute condition, wherein the rating cells can be updated based upon these detected conditions. Further, the processor may be operable to provide these updated rating cells as feedback to update the atomized model.

In some embodiments, a tangible, non-transitory, computer-readable media having instructions whereupon which, when executed by a processor, cause the processor to perform the adaptive data processing method described herein. The method may include applying the two or more predictive algorithms or rule-sets to an atomized model to generate applied data models. After receipt of inputs, the method may further include processing at least two propositions during a learning mode based upon detection of at least one absolute pattern within the applied data models; wherein propositions are action proposals associated with each predictive algorithm. At least two propositions may compete against each other through the use of an associated rating cell, which may be updated based upon the detected patterns. The method may further include processing propositions during an execution mode based upon detection of an absolute condition, wherein the rating cells are updated based upon these detected conditions. Further, these updated rating cells may be provided as feedback to update the atomized model.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one so skilled in the art without departing from the spirit and scope of the described embodiments.

DETAILED DESCRIPTION

Figure 1:
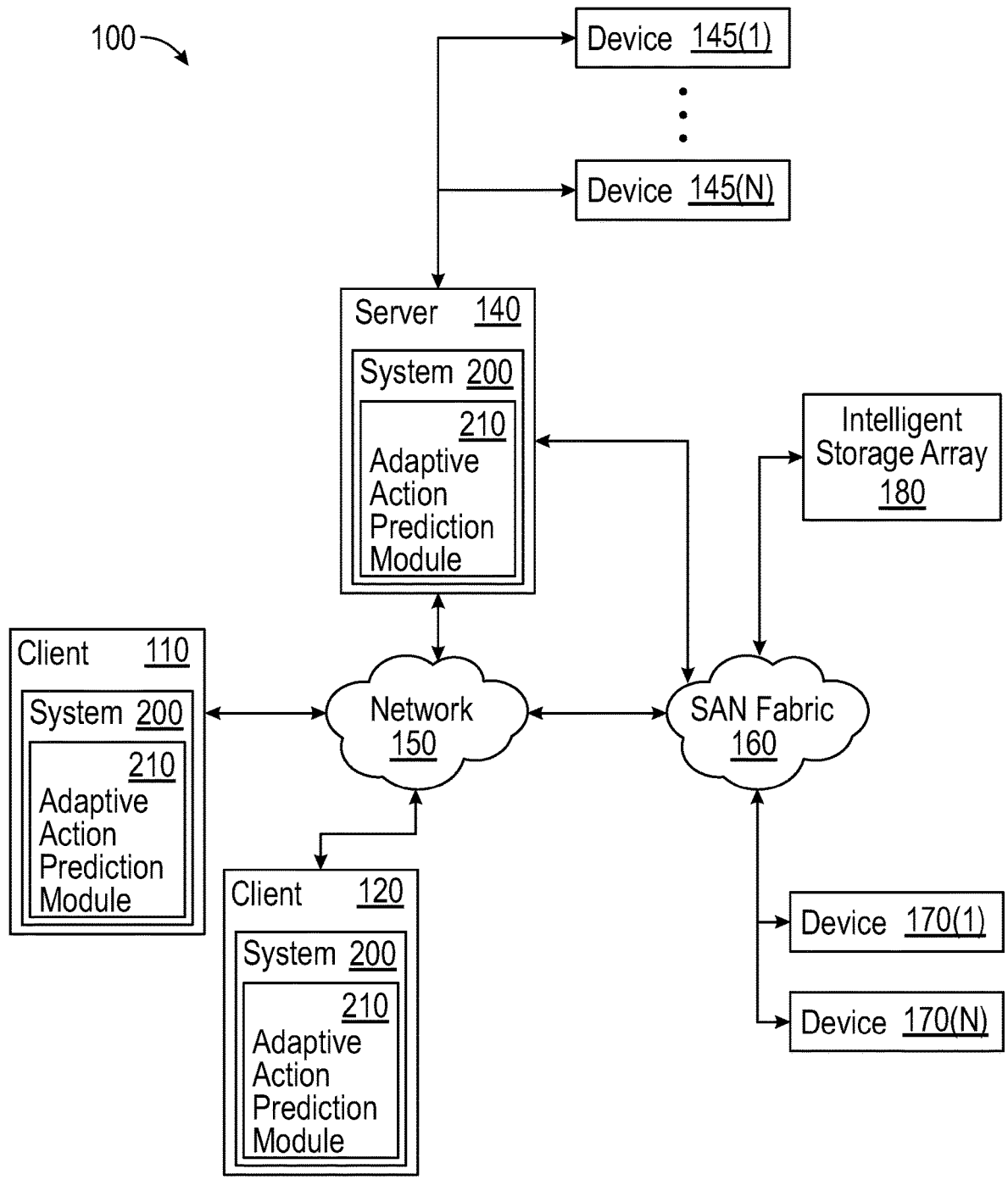
FIG. 1 is a block diagram of an exemplary network for adaptive data processing associated with complex dynamics, in accordance with some embodiments.

The following embodiments describe a system and method for adaptive data processing associated with complex dynamics. It can be appreciated by one skilled in the art, that the embodiments may be practiced without some or all of these specific details. In other instances, well known process operations have not been described in detail in order not to unnecessarily obscure the embodiments.

In some embodiments for a system of generating data adaptive data processing associated with complex dynamics, the method may include applying the two or more predictive algorithms or rule-sets to an atomized model to generate applied data models. After receipt of inputs, the method may further include processing at least two propositions associated with each predictive algorithm during a learning mode based upon detection of an absolute pattern within the models, wherein a proposition is an action proposal suggested by a particular predictive algorithm. At least two propositions may compete against each other through the use of at least one associated rating cell, which may be updated based upon the detected patterns; wherein, each rating cell indicates a ranking of the proposition with respect to all others. The method may further include processing these propositions during an execution mode based upon detection of an absolute condition, wherein the rating cells are updated based upon these detected conditions. Further, these updated rating cells may be provided as feedback to update the atomized model. Thereby, a system can be modeled by adaptively processing existing models having smaller building blocks (atoms) based upon a select group of predictive algorithms, whereby propositions are ranked and selected for the best fit of the system whether during a learning sequence or during operation.

Advantageously, the method for generation of adaptive action in systems having complex scenarios in accordance with the system disclosed herein achieves a faster and more accurate method of predictive data processing than that which previous systems have provided. The systems and methods described herein offer a better approach of predictive analysis over Meta Heuristics, which predicts a system based upon functional similarity. Further, these systems and methods described herein offer a more advanced, inversed version of keying and keyed hashing, where the actions and features are first found, and then evaluated. The method described herein makes it easy to introduce new inputs into a system, wherein large numbers of output are generated. The adaptive data processing scheme described herein simplifies the connection of simulated variants. ELO-like feedback can be employed for fast adaptation according to a distribution of algorithms having differing efficiency for different complex environments. The adaptive data processing method and system described herein does not require excessive space in RAM. As such, the method in accordance with some of the embodiments disclosed herein establishes an optimal and cost effective manner of rendering system simulation.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "selecting," "retrieving," "initiating," "applying," "processing," "updating," "detecting," "determining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Regarding usage and terminology, in this disclosure, unless otherwise specified and/or unless the particular context clearly dictates otherwise, the terms "a" or "an" mean at least one, and the term "the" means the at least one. The term "proposition" means an action proposal suggested by a predictive algorithm.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment. Like reference numbers signify like elements throughout the description of the figures.

Referring to FIG. 1, an exemplary embodiment of system for adaptive data processing associated with complex dynamics is shown. As shown, the exemplary network architecture 100 may include client systems (computing devices) 110 and 120, and in communication with server 140 through network 150. As detailed above, all or a portion of network architecture 200 may perform and/or be a means for performing, either alone or in combination with other elements, one or more of the steps disclosed herein (such as one or more of the steps illustrated in FIG. 3). All or a portion of network architecture 100 may also be used to perform and/or be a means for performing other steps and features set forth in the instant disclosure. In one example, computing device 110 may be programmed with one or more of modules 210 (described in detail below). Additionally or alternatively, server 140 may be programmed with one or more of modules 210. Although not shown, in various embodiments, the client node (110, 120) including system 200 may be notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), set-top boxes, cameras, integrated devices combining at least two of the preceding devices, and the like.

Figure 4:
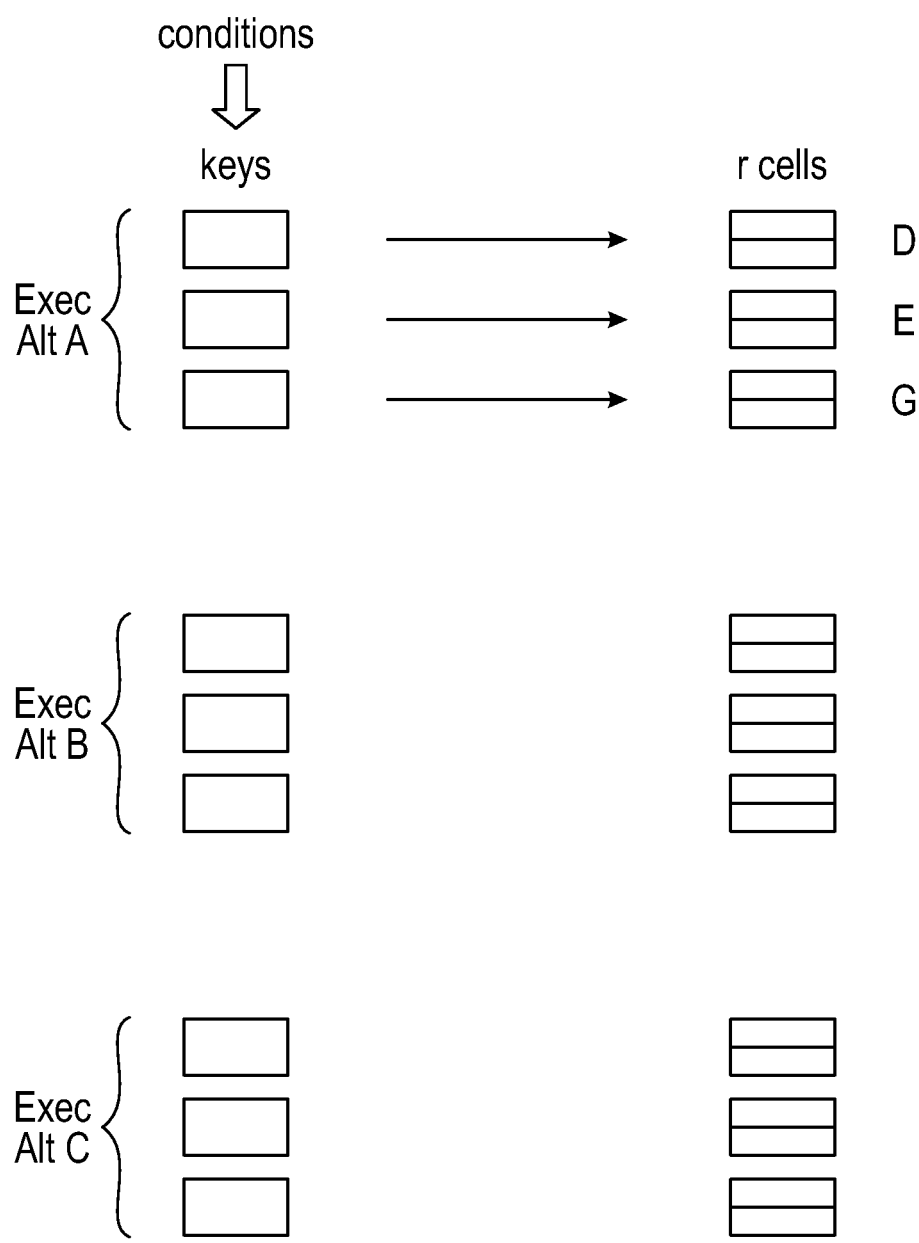
FIG. 4 is a block diagram representing a setup for co-weighting of acting proposition segments and comparison between alternatives, in accordance with some embodiments.

Client systems 110 and 120 generally represent any type or form of computing device or system, such as exemplary computing system 400 in FIG. 4. Similarly, server 140 generally represents computing devices or systems, such as application servers or database servers, configured to provide various database services and/or run certain software applications. Network 150 generally represents any telecommunication or computer network including, for example, an intranet, a WAN, a LAN, a PAN, or the Internet. In one example, client systems 110, and/or 120 and/or server 140 may include all or a portion of system 200 from FIG. 2.

In some embodiments, one or more storage devices 145(1)-(N) may be directly attached to server 140. Storage devices 145(1)-(N) generally represent any type or form of storage device or medium capable of storing data and/or other computer-readable instructions. In certain embodiments, storage devices 145(1)-(N) may represent Network-Attached Storage (NAS) devices configured to communicate with server 140 using various protocols, such as Network File System (NFS), Server Message Block (SMB), or Common Internet File System (CIFS)

Server 140 may also be connected to a Storage Area Network (SAN) fabric 160. SAN fabric 160 generally represents any type or form of computer network or architecture capable of facilitating communication between a plurality of storage devices. SAN fabric 160 may facilitate communication between server 140 and a plurality of storage devices 170(1)-(N) and/or an intelligent storage array 180. SAN fabric 160 may also facilitate, via network 150 and server 140, communication between client systems 110 and 120, and storage devices 170(1)-(N) and/or intelligent storage array 180 in such a manner that devices 170(1)-(N) and array 180 appear as locally attached devices to client systems 110 and 120.

In certain embodiments, and with reference to exemplary computing system 400 of FIG. 4, a communication interface may be used to provide connectivity between each client system 110 and 120 and network 150. Client systems 110 and 120 may be able to access information on server 140 using, for example, a web browser or other client software. Such software may allow client systems 110 and 120 to access data hosted by server 140, storage devices 145(1)-(N), storage devices 170(1)-(N), or intelligent storage array 180. Although FIG. 1 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 140, storage devices 145(1)-(N), storage devices 170(1)-(N), or intelligent storage array 180, or any combination thereof. All or a portion of one or more of the exemplary embodiments disclosed herein may also be encoded as a computer program, stored in server 140, and distributed to client systems 110 and 120 over network 150.

One or more components of network architecture 100 may perform and/or be a means for performing, either alone or in combination with other elements, one or more steps of an exemplary method for adaptive data processing.

It is appreciated that the components of exemplary operating environment 100 are exemplary and more or fewer components may be present in various configurations. It is appreciated that operating environment may be part of a distributed computing environment, a cloud computing environment, a client server environment, and the like.

Figure 2:
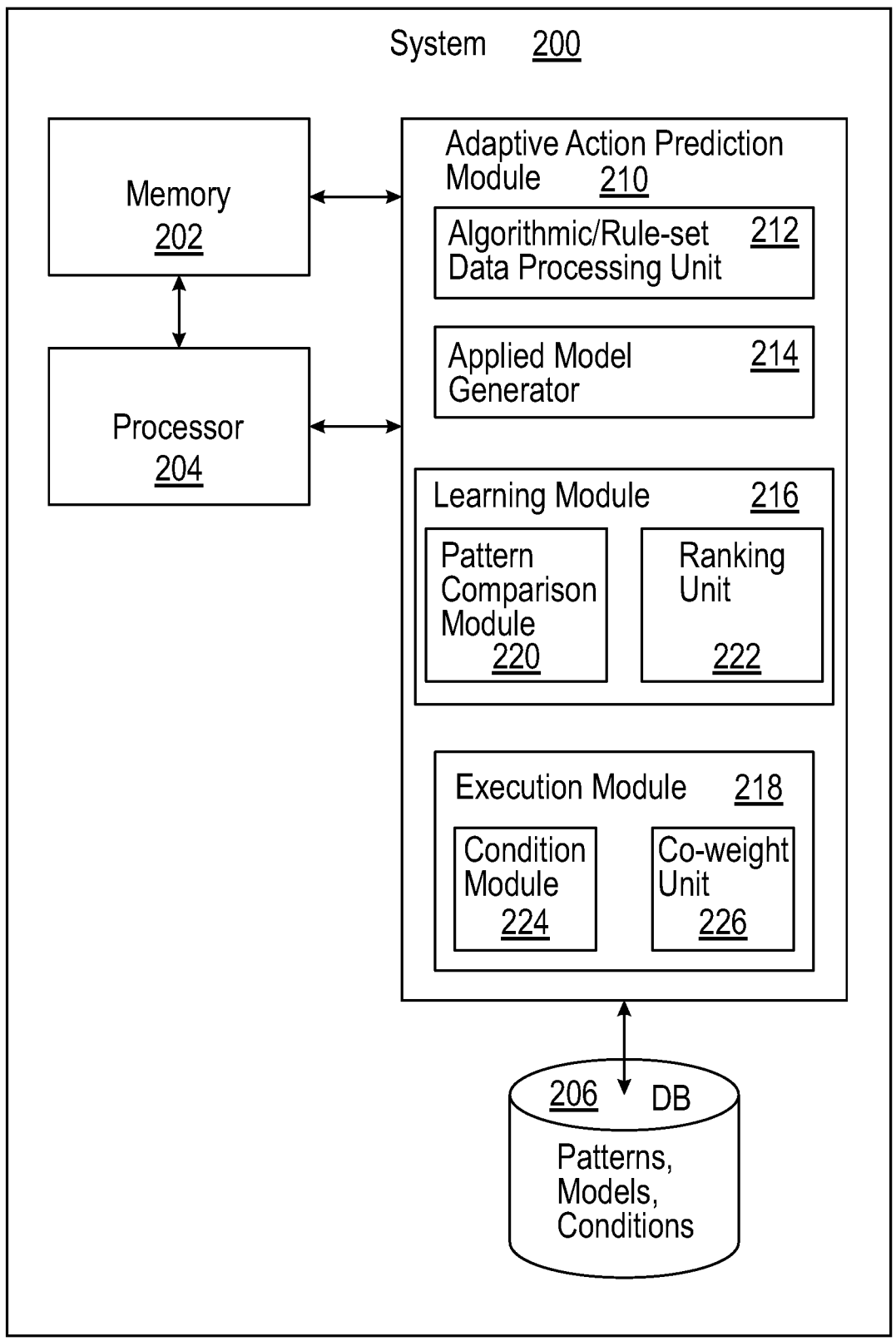
FIG. 2 is a block diagram of an exemplary system for adaptive data processing within the components of the exemplary network of FIG. 1, in accordance with some embodiments.

Referring to FIG. 2, an exemplary embodiment of system for adaptive data processing associated with complex dynamics is shown. Exemplary system 200 may be implemented in a variety of ways. For example, all or a portion of exemplary system 200 may represent portions of exemplary system 100 in FIG. 1. As illustrated in this figure, exemplary system 200 may include a memory 202, a processor 204, and a storage database 206. The system may include one or more adaptive action prediction modules 210 for performing one or more tasks. For example, and as will be explained in greater detail below, system 200 may include an algorithmic/rule-set data processing unit 212 for processing multiple instances of schemes having different purposes. For example, interpretation may in a sense be seen as an action and simulation driven process. In particular, pattern recognition may use general, visual atoms, such as curves, single symmetries, multi symmetries, angles, basic forms like ellipses and trapezoids, parallelism, long lines, contrasts, contrasting bodies, gradients, colors, movements and the like, and apply inversed keying (keying with base in the locality of atoms) to propose further atoms. These atoms may then be evaluated by means of probability of co-occurrences, giving rise to complex "chunk" occurrences, which can be suggested as part of a scenario having initial focuses and hotspots dependent upon an objective. In the case of chess or other games based upon discrete relations and actions, one way to arrange an algorithmic/rule-set data processing unit 212 can be through the implementation of a rule-set, that suggest actions (i.e. moves of the game pieces).

In various embodiments, algorithmic/rule-set data processing unit 212 may incorporate the use of various algorithms for predictive analysis. In some embodiments, one of the fastest ways in which to describe the occurrence of specific features in a structured or non-structured collection is through the method of "keying." This method makes it possible to describe basic features as a set of logical answers: IS or IS NOT. It can be used to describe different items including documents, chemical structures, and other scenarios where specific features to be described are known. Each item may be described as a bitstring, in which each position translates directly to whether a defined feature is present or not. In order to describe similarities between bitstrings of different lengths, a metric system known as the "Tanimoto coefficient" may be incorporated. However, it is best to work with bitstrings of predetermined length.

In some embodiments, a slightly more advanced version of keying may be implemented, where structures, documents or situations are chosen by means of the probability of various features and translated into multiple hashing positions per feature. This version of keying uses the principle of hashing. In general, hashing can be used to randomize the order of access to data, where mixed data objects are used within a limited memory space. If the probability for any bit to be set in a random position is 0.5, each added position in a hash pattern encoding a feature, divides the likelihood of a false positive with 2, which can then be resolved in other ways.

In another embodiment, generic algorithms often categorized as a subgroup of meta-heuristics can be implemented; wherein, meta-heuristics can refer to methods that operate on the same principle as the concept of natural selection. These types of algorithms are used in cases where there is limited information about the end functions. They can also be described as a blind process or indirect targeting. In operation, the algorithms may be continually run, where continuous proposals for a solution (propositions) can be presented. Sequentially, each proposition represents a greater solution having no risk for a stoppage of the progress due to local minima, which tends to be a major concern when using iterative methods for gradient descent. Generic algorithms are generally very accurate and they give better results over other methods. These types of algorithms can enable an unlimited number of factors, which can be included when generating a solution within a short period of time.

In contrast, meta-heuristics may be the associate algorithm implemented, wherein, meta-heuristics represents a problem-independent iterative approach to manipulate underlying subordinate heuristics beyond the local optima. Meta-heuristics framework can be randomized or even deterministic in nature but could be generic like black box testing. Through the use of metaphors, the meta-heuristics framework can be easily optimized. For example, natural evolution (genetic or evolutionary algorithms), the cooling of a crystalline solid (simulated annealing), and the behavior of animal swarms (ant colony optimization) can all be implemented using the meta-heuristic framework. Meta-heuristics can be classified into three categories or a blend of three: (1) Local search meta-heuristics which iteratively build trivial changes to a single solution, (2) constructive meta-heuristics which build solutions from their originating space, and (3) population-based meta-heuristics which iteratively integrate solutions into a single one.

In some embodiments, heuristics can be the selected algorithm, where heuristics represents a problem-dependent, problem-specific decision-making approach for large-scale solutions to complex combinatorial optimization problems. A heuristic seeks to provide an acceptable required solution at lower computational costs. This algorithm enables the exploitation of a structural problem framework that avoids entrapment of local optima associated with a fraction/share to achieve global optimality. In practice, this may be implemented by fine-tuning the algorithms based upon the actual needs and requirements of the system. Heuristics is largely based upon trial-and-error, wherein repeated learning and discovery processes are necessary. Thereby, performance can be improved through the evaluation of results and utilization of self-correction techniques.

In some embodiments, the algorithmic/rule-set data processing unit 212 may utilize an Artificial Neural Network (ANN) as a means of Artificial Intelligence (AI), where ANN can be a favored choice of an algorithm for versatility and image processing capabilities. ANN mimics the structure of a human brain having intra-neural connections that are strengthened or weakened depending on whether or not its predictions are perceived as correct. Some ANNs is based upon the principles of Deep Learning (DL) and has a wide application in AI. Some of the advantages of using ANN include flexibility and ease of adaptability for solving a variety of problems. ANN can handle numerous and complex data, wherein many data points can be processed with reliable results. Once a model has been trained using many inputs, the model can be left to run and generate reliable predictions on its own. ANN perform various functions by splitting commands into smaller parts, which are rapidly processed. The basic purpose of AI is the utilization of software to implement the performance of human tasks; wherein, human error is minimized, improving effectiveness and efficiency.

Referring back to FIG. 2, the system 200 may further include an applied model generator 214 for applying the two or more predictive algorithms or rule-sets to the atomized model to generate two or more applied data models. For example, a generic algorithm and ANN may be applied to a non-primitive atomized model to generate an applied data model for further analysis. Further, the system may include a learning module 216 for processing two or more propositions during a learning mode based upon detection of an absolute pattern within the two or more applied data models.

Continuing with the same example, in some embodiments learning module 216 may seek to detect an absolute pattern associated with the applied data model that corresponds with the propositions suggested by both the generic algorithm and ANN. In particular, the learning module 216 may include a pattern comparison module 220 for detecting whether an absolute pattern exists within the inputs relative to the applied data model and a ranking unit 222 for retrieving one or more propositions associated with the detected absolute pattern and updating each rating cell corresponding to the retrieved one or more propositions.

In some embodiments, ranking unit 222 may implement the use of a rating cell to propagate the result of the algorithm comparison in a distribution of algorithms. In other embodiments, the methodology of ELO may be implemented within ranking unit 222. In particular, for the rating cell implementation a probability rating may be measured. The rating cell provides an answer to the question of the probability of a win against an intermediate algorithm within the field. For each proposition, the estimated probability rating (r) for winning is:

$$r = \frac{\text{Numerator}}{\text{Denominator}} \text{ where}$$

$$\text{Numerator} = 1 + \sum_{i=0}^{n} r_i$$

$$\text{Denominator} = 2 + \sum_{j=0}^{m}(1 - r_j) + \sum_{i=0}^{n} r_i$$

and where i represents the index of losing opponents associated with a series from 0-n, and where j represents the indexes of the opponents of associated with a series from 0-m, with $r_i$ and $r_j$ representing their respective ratings at the points in competition. The Numerator and Denominator are saved separately as floating point numbers within the cell. The probability for losing against an average opponent will be 1−r. A win will add $r_{opp}$, the rating of the opponent proposition, to both the Numerator and the Denominator, while a loss will add $(1-r_{opp})$ to the Denominator. Equation 1 denotes the case with one proposition of rating r in an unlimited field of average opponents, where $r_{opp}$ equals 0.5. Continuous fallouts will approach r. Therefore, $r_{up}$ (the updated rating) will remain stable. In a second scenario, where there is a set of two propositions with an average rating of 0.5, continuous fallouts approach r ($E_{qn}$ 2). Similarly, given the case where $r=r_{opp}$, continuous fallouts approach r ($E_{qn}$ 3).

$$r_{up} \approx \frac{r * r_{opp}}{r * r_{opp} + (1 - r) * (1 - r_{opp})} \quad (E_{qn}\ 1)$$

$$r_{up} \approx \frac{(r/(1-r)) * r_{opp}}{(r_{opp}/(1-r_{opp})) * (1 - r_{opp}) + (r/(1-r)) * r_{opp}} \quad (E_{qn}\ 2)$$

$$r_{up} \approx \frac{r^2/(1-r)}{r + r^2/(1-r)}. \quad (E_{qn}\ 3)$$

Further, the system may include an execution module 218 for processing two or more propositions during an execution mode based upon detection of an absolute condition within the two or more applied data models. For example, system principles and practices can enable an administrator to set the conditions for a preferred future. These conditions may be used to further modify the atomic model of the system. In particular, the execution module 218 may include a condition module 224 for detecting whether absolute conditions are satisfied and a co-weighting unit 226 for co-weighting two or more propositions based upon detected post patterns and determining a likelihood of a win, for a first proposition winning against a second proposition.

In some embodiments, co-weighting unit 226 may implement co-weighting of independent ratings through first performing a rough estimate of getting each rating by "pure chance" ($p_{chance}$) and using this estimate as a weight:

$$\frac{p_1 \frac{1 - p1_{chance}}{p1_{chance}} + p_2 \frac{1 - p2_{chance}}{p2_{chance}}}{\frac{1 - p1_{chance}}{p1_{chance}} + p_2 \frac{1 - p2_{chance}}{p2_{chance}}}, \quad (E_{qn}\ 4)$$

where, $p_1$ is probability rating of a first proposition and $p_2$ is probability rating of a second opponent proposition. Since the rating cell contains a mirror of a win quota, $p_{chance}$ can for instance be estimated by the following formulas:

$$p_{chance} = \frac{C_1}{C_2}, \text{ where } C_1 = \frac{n!}{r!(n-r)!}, C_2 = 2^n, \quad (E_{qn}\ 3)$$

and
where n represents the rounded denominator of the rating cell and r represents the rounded numerator. As these calculations may be slow, it is preferable to send a call to a cache for generation of $p_{chance}$.

In some embodiments, a more advanced version of updating a rating cell during the learning mode may be implemented, where a win will add $r_2*(1-r_1)+r_2*|r_1-r_2|$ to the numerator; and add $r_2*(1-r_1)+r_2*|r_1-r_2|$ to the denominator. A loss will add $(1-r_1)^2+(1-r_1)*|r_1-r_2|$; where $r_1$ is the rating for the algorithm itself and $r_2$ is the rating of the opponent algorithm. After the update, Numerator(win), Denominator (win), Numerator(loss) and Denominator(loss) may all be multiplied by a damping factor, such as for example 5000/5001.

In some embodiments, co-weighting unit 226 may detect the likelihood of proposition A winning against proposition B using the following equation:

$$p_{A\ Win} = \frac{r_A * (1 - r_B)}{r_A * (1 - r_B) + r_B * (1 - r_A)} \quad (E_{qn}\ 5)$$

where $r_A$ and $r_B$ are the probability for A and B, to win against an average opponent algorithm, respectively.

Regarding weighted feedback from co-weighting unit 226 supplied to the applied model generator 214, if a probability is co-calculated from a number of fractionally weighted participants, each feedback to the participants must also be done using the same fractions. Once this probability is retrieved, the expected win/loss ratio ($q_A$) for proposition A winning against proposition B can be calculated in an standard fashion as:

$$q_A \frac{p_{A\ Win}}{1 - p_{A\ Win}} \quad (E_{qn}\ 6)$$

where the probability $p_{AWin}$ may be detected from the win/loss ratio ($q_A$):

$$p_{A\,Win} = \frac{q_A}{1+q_A}. \qquad (E_{qn}\ 7)$$

There are different types of weights that may be considered for co-weighting including, action weighting for simulation and possible action weighting for real action. Co-weighting with a chance factor can meet the objective of lessening the impact of indifferent information on an intermediate element. Regarding action weighting, the simulation of actions is not necessarily indifferent and therefore earn consideration after factual value. They are still absolute alternatives. Since extremely low probability action alternatives only represent themselves and, not a secondary influence, these must not be weighted up as compared with average actions. Action weighting for simulation is therefore generally done using factor 1 for all actions. For real execution, however, the user may customize the factors. The general principle is to use weights, which are all 1, but it is also possible, for example, to always pick the action with the highest sum value from all participating propositions for real execution. With common co-weighting, the weights can be put separately into the numerator and denominator. This may give a slightly different result, but the learning is still guided by the principle of addition of probability proportional fractions. Advantages of this approach include time efficiency of processing, where numerator and denominator are stored separately.

In some embodiments, the exemplary system 200 may include a transmitter (not shown) that may send and receive, at a server and from a client, a request that seeks to communicate according to a data process for a system having complex dynamics. In addition, the transmitter may couple to receive the public code and an obfuscated matrix pattern in accordance with the process disclosed herein. Although illustrated as separate elements, one or more of modules 210 in FIG. 1 may represent portions of a single module or application.

In certain embodiments, one or more of modules 210 may represent one or more software applications or programs that, when executed by a computing device, may cause the computing device to perform one or more tasks. For example, and as will be described in greater detail below, one or more of modules 210 may represent software modules stored and configured to run on one or more computing devices, such as the devices illustrated in FIG. 1 (e.g., computing device 110 and/or server 140), and/or computing system 500 in FIG. 5. One or more of modules 210 in FIG. 2 may also represent all or portions of one or more special-purpose computers configured to perform one or more tasks.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Figure 3:
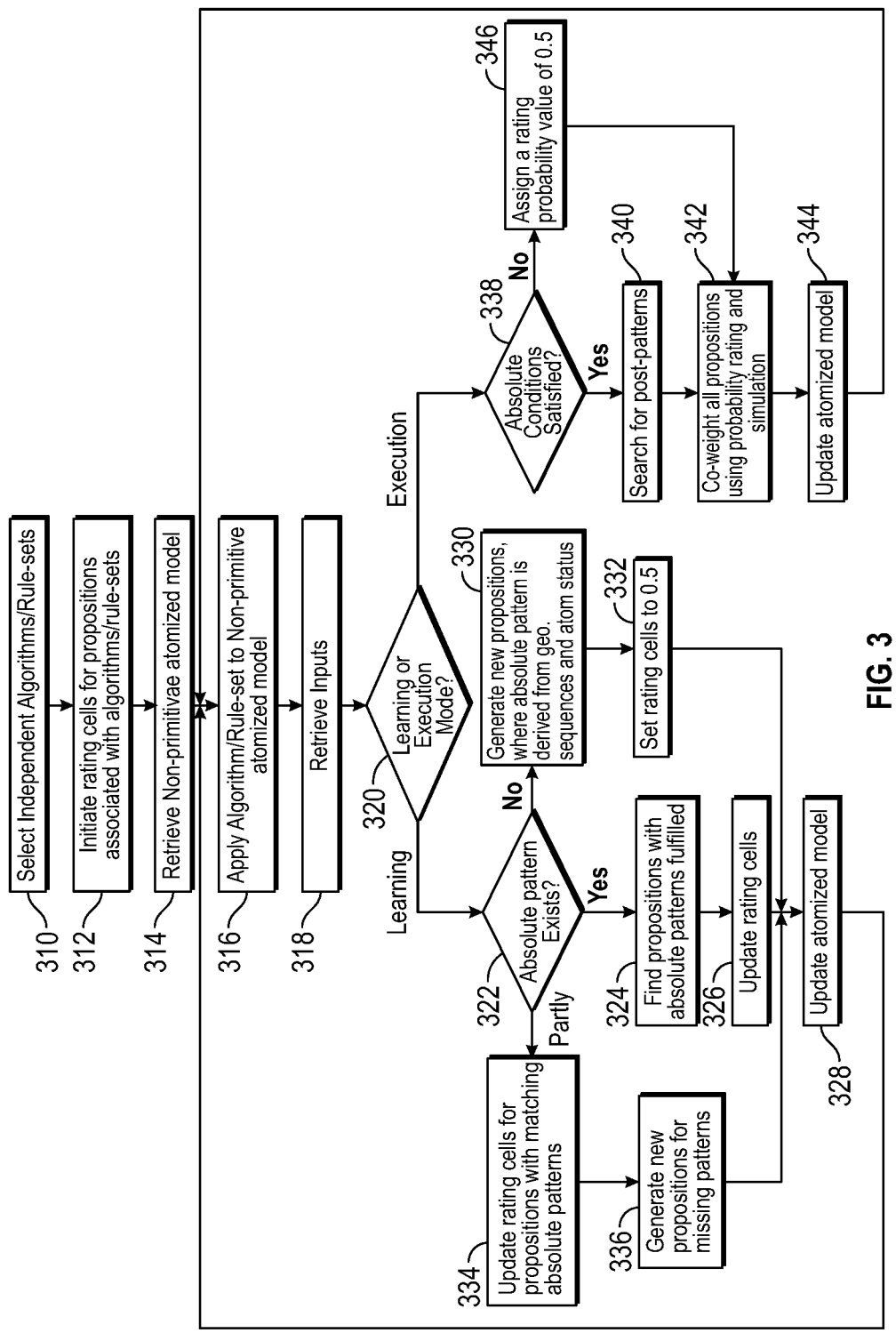
FIG. 3 is an exemplary flow diagram of a method for adaptive data processing associated with complex dynamics, in accordance with some embodiments.

Referring now to FIG. 3, an exemplary flow diagram of a method for data processing for a system having complex dynamics, in accordance with some embodiments is illustrated. In an action 310, the data processing system 100 may select one or more algorithms. In the alternative, one or more rule-sets may be selected. For example, system 100 may select meta-heuristics and ANN. Next, the rating cells for the possible suggested propositions (action proposals) associated with each algorithm and/or rule-set may be initialized in an action 312. In particular, the rating cells may be initialized to 0.5. The method may include processing multiple instances of schemes having different purposes. For example, interpretation may in a sense be seen as an action and simulation driven process. In particular, pattern recognition may use general, visual atoms, such as curves, single symmetries, multi symmetries, angles, basic forms like ellipses and trapezoids, parallelism, long lines, contrasts, contrasting bodies, gradients, colors, movements and the like, and apply inversed keying (keying with base in the locality of atoms) to propose further atoms. These atoms may then be evaluated by means of probability of co-occurrences, giving rise to complex "chunk" occurrences, which can be suggested as part of a scenario having initial focuses and hotspots dependent upon an objective. In the case of chess or other games based upon discrete relations and actions, the method may select a rule-set that suggests particular actions (i.e. moves of the game pieces).

In an action 314, a non-primitive atomized model may be retrieved from storage. For each model, recognized atoms having some diversity are associated with the model. The concept of the model implicates that scenario, feedback and objective are pre-determined. The model may include actions derived from, for example: a general concept, a meta model, bringing objects together, separate objects, bringing objects to hotspot, disposing objects, retrieving objects, compiling objects, dissolving objects, or putting objects in position with some specific reference.

Further, application of the selected algorithms and/or rule-sets to the non-primitive atomized model to generate an applied data model may occur in an action 316. In an action 318, the method may include retrieving inputs corresponding to the system that is being emulated. In a decision action 320, the method may include detecting whether the system is in a learning mode or in an execution mode. These modes can be overlapping. Thus, a system can be evaluating, simulating, and executing actions, while simultaneously learning from its own actions. Actions can be refined by simulation and also fed back to update the model.

If the system is in a learning mode, the method may include detecting whether an absolute pattern exists within the applied data model with respect to the retrieved inputs, in a decision action 322. The proposition represents a bearer of action proposals, wherein each action includes pre-patterns. For example, in the case of chess, pre-patterns can be the squares surrounding the involved player and the associated possible moves. In non-discrete cases, such as for example, the requirement for increasing the angular and distance relations between the atoms in the environment can be used for identification. Additionally, non-geometrical factors can be set as absolute preconditions.

If an absolute pattern is detected, the method may include searching for propositions having these absolute patterns fulfilled, in an action 324. The method may further include updating the rating cell associated with the proposition, in an action 326. In particular, all the winning propositions having a winning action are updated as winners, where the calculation is based upon the probability ratings of all involved propositions. For all non-performed actions, the propositions are updated as losers. Further, the atomized model may be updated in an action 328. If there are no detected absolute patterns, the method can include generating new propositions based upon a geometrical sequences and the status of the atoms associated with the same, in an action 330. Further, the rating cell for these new propositions can be set to 0.5, in an action 332. If there is a partial detection of an absolute pattern, the method may include updating the corresponding rating cells aligning with these patterns and generating new propositions for missing patterns, in actions 334 and 336, wherein if the rating cells are updated in step 334, only the remaining rating cells that have not been updated are updated in action 336.

During the learning mode, the principle is to let different propositions compete against each other, followed by rating updates. Ratings like ELO, Glicko and Trueskill are viable options for trying to predict some kind of skill. ELO is widely used, most notably for ranking chess players, as is Glicko, which targets the same type of problems. In contrast, Trueskill is specially designed for ranking teams. The proposed type of ranking in the adaptive data processing method and system disclosed herein targets actions, rather than human players. The adaptive data processing method disclosed herein is developed for three things, including but not limited to: speed; higher generality with respect to the associated probability distribution; and for easy co-weighting. Incorporation of a damping factor can also render higher significance for more recent learning. The rating of propositions can be applied as a means for a fast sort of a vast field of competitors for prediction of future competitions.

During the execution mode of operation, the method may include detecting whether absolute conditions are satisfied by the propositions in a decision action 338. As a result of detecting absolute conditions, the method may include searching for post-patterns, in an action 340. Co-weighting of all propositions may occur using a derived probability rating and simulation in an action 342. As a result of no detected absolute conditions, the method may include assigning a probability value of 0.5 to the proposition, in an action 346. Finally, the method may include updating the atomized model in an action 344.

In some embodiments, the absolute post patterns generated by the actions can be searchable in memory. If propositions with these patterns are found, the conditions given by the situation renders the set of conditional rating cells active. All active rating cells of all propositions can be co-weighted, action-by-action, after actualized post patterns.

Referring now to FIG. 4, a block diagram representing a setup for co-weighting of acting proposition segments and comparison between alternatives in some embodiments is shown. Execution alternatives A, B and C represent independent actions, wherein A is competing against B and C and all alternatives are competing against each other. Co-weighting may be conducted with respect to the participating propositions for each action. A is proposed by the probability score of co-weighted D, E and G. In the same way, B and C can be supported by their respective co-weighted propositions. Co-weighting is an approximation as to the likelihood of differing propositions. These may not be known prior to execution and can be tested as stand alone combined options. As such, the most performance efficient co-weighting may be:

$$r_{Action} = \frac{f_1 * D' + f_2 * E' + f_3 * G'}{f_1 * D'' + f_2 * E'' + f_3 * G''} \quad (E_{qn} \ 8)$$

where D', E', and G' represent the numerator of D, E, and G; and D", E," and G" represent the denominator; $f_1$-$f_3$ are the weights for respective propositions, which may be chosen based upon performance or possible probability distributions. A very conservative variant may be to simply use 1 in all cases. Alternatively, co-weighting may occur based upon how likely it is that different values are random in nature. In operation, the algorithm associated with the winning action is run first, as it is most likely to render a positive result. If the result is positive, the other algorithms do not need to be run, thereby saving time.

During execution, the value associated with $r_{Action}$ can be inserted within the formula below to compute the probability for one action (A) amongst various other alternatives. In particular for an embodiment where there are three other alternative propositions, the following represents the probability for the proposition to win:

$$p_{A \, Win} = \frac{R_A}{R_A + R_B + R_C + R_D} \quad (E_{qn} \ 9)$$

where $R_A=r_A*(1-r_B)*(1-r_c)*(1-r_D)$; $R_B=r_B*(1-r_A)*(1-r_c)*(1-r_D)$; $R_c=r_c*(1-r_A)*(1-r_B)*(1-r_D)$; and $R_D=r_D*(1-r_A)*(1-r_B)*(1-r_c)$.

The $r_{Action}$ values from all actions can be inserted into the equation noted supra, to derive the probability divided according to the respective weight of each proposition/modal representative. In some embodiments, however, $p_{AWin}$ may not be calculated during the learning mode. Specifically, Equation 9 ($E_{qn}$ 9) describes how to compute the probability for one action (A) amongst three alternatives. Each field is the rating for one action proposal. For example, if each proposition possessed the same rating value, for instance 0.6 in all fields, the propositions would each be equally likely to win, p=0.25. If, however, $r_A$=0.6 and all others 0.5, $p_{Awin}$ will be 0.33 and the others 0.22. Thereby, the probability would be 0.33/0.22, which is 1.5. This also equates to the fraction 0.6/(1−0.6) for this particular example.

In some embodiments for N action alternatives, the probability for the proposition to win:

$$p_{k \, Win} = \frac{r_k \prod_{\substack{i=1 \\ i \neq k}}^{n} (1 - r_i)}{\sum_{j=1}^{N} r_j \prod_{\substack{i=1 \\ i \neq j}}^{n} (1 - r_i)}, \quad (E_{qn} \ 10)$$

where k is the index of the winning proposition; n is the number associated with each proposition; and N is the maximum number of all propositions being considered.

Figure 5:
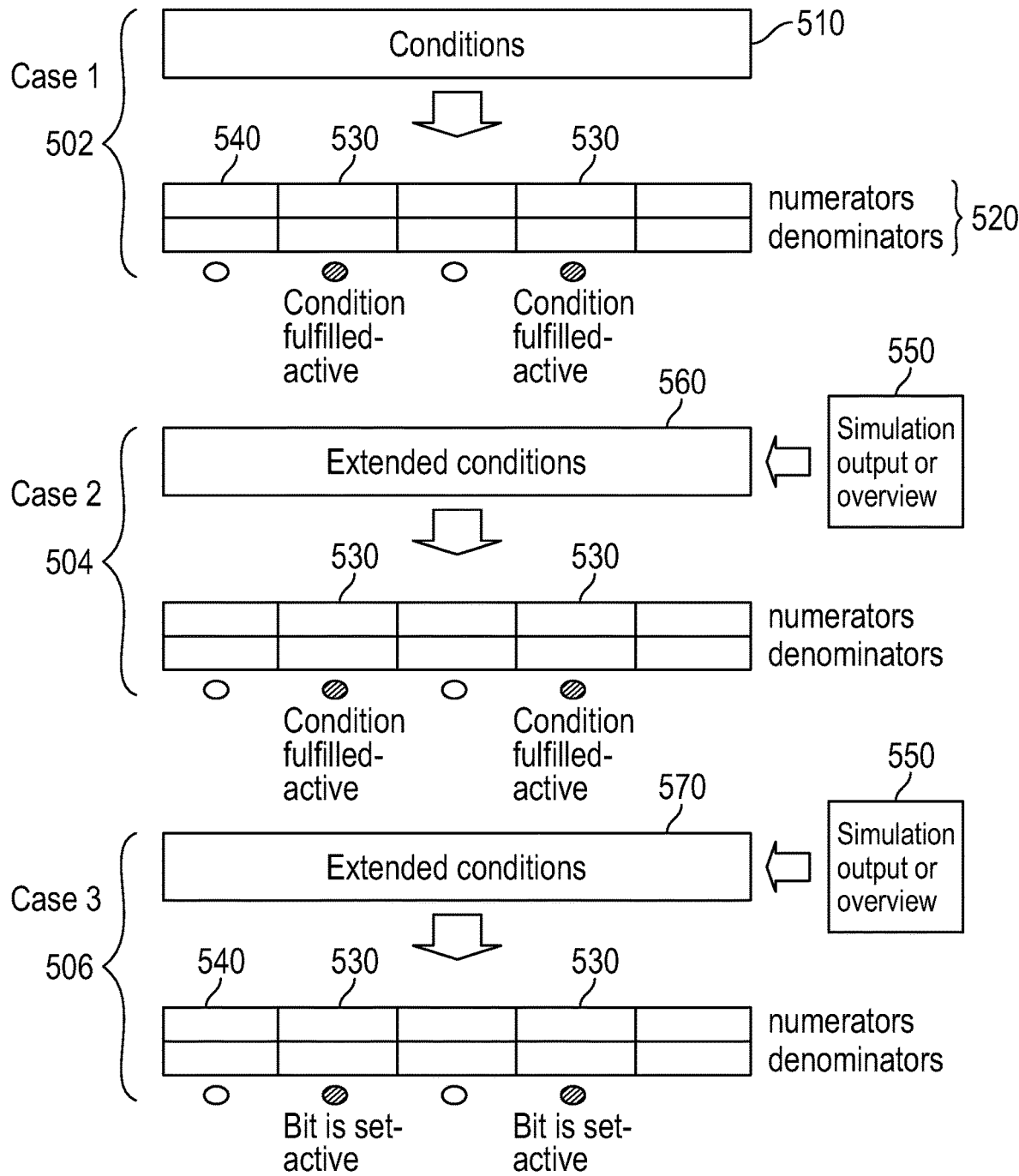
FIG. 5 is a block diagram representing a set of rating cells associated with three differing scenarios, in accordance with some embodiments.

Referring now to FIG. 5, a block diagram representing a set of rating cells associated with three differing scenarios in accordance with some embodiments is provided. In some embodiments, a single rating cell for each proposition may be replaced with multiple rating cells. The average, or possible weighted average of these rating cells, can represent the rating for the proposition. Regarding feedback to these rating cells during the learning mode, a flat feedback may be recommendable. When weighted feedback and a parallel rating cell are implemented, prevention of feedback loops may be preferable. The first case (case 1: 502) shown in FIG. 5 illustrates how different conditions 510 associated with a scenario that actualizes one proposition among others, can be translated into a set of bit flags matching the multiple cells 520 of the set. The flags corresponding to the fulfilled conditions can be turned on, activating each respective corresponding rating cell 530 in a case-by-case manner. The rating cells of non-fulfilled conditions 540 can be represented as passive or dormant, inactive cells. Since the active rating cells in an identical situation will be the same during learning and execution, the outgoing rating representation will also be identical. Similar situations will have similar combinations of active rating cells; and therefore, similar rating representation.

During the learning mode, the rating cell average from all sets represents the proposition. The rating output can be inserted in the rating formula (Equation 8) and updated as noted supra. The feedback to the proposition can be weighted according to the rating, which is determined by Equation 8 as well. Similarly, during execution or simulation, the rating cell average from all sets may also represent the proposition, wherein the rating output can be inserted in rating formula (Equation 8).

The second case (504), shown in FIG. 5, illustrates how different extended conditions 560 retrieved from a simulation may illustrate the same principle. Accordingly, similar case scenarios may have similar combinations of active rating cells; and therefore, similar rating representation. Further, there are two points of observation to note. First, the similarity obtained can be functional and provisionary in nature. For this embodiment to be functional, simulation must be active during the learning mode. Second, the possibility of multilayer simulation can be introduced. The extended conditions 560 can thereby refine the action probabilities of different actions, wherein updated probabilities can then be used for a more accurate, secondary simulation. Since higher layers of simulation will likely require more complex database searches, the higher frequency of lower layers of simulation may frequently match higher simulation processes. Accordingly, multiple layers of simulation may be performed in parallel.

The third case (506), shown in FIG. 5, illustrates how a similarity matrix can be applied to a set of rating cells, using the same principle. Similar to conditional flagging, the bitstring representations of a profile 570, which are parts of a similarity matrix, can affect the model. Given that all atoms in the model of understanding are used by the system, the simulation or analysis results are therefore subject to feedback to the atomized model 314. Bitstring 570 can arise from a case associated with certain actions or situation constituents (such as sub patterns) in the present or in a simulated future 550. For example, presuming the following factors: (1) all propositions correspond to a bitstring that contains equal numbers "1" and "0," and (2) all bitstrings are of identical length, evenly dividable by two, and divergent vis-à-vis each other, any situation can now ideally be translated into a bitstring that contains the essential traits of its functional parts. In particular, by weighting propositions based upon importance and selecting the 50% highest, any situation can be translated into a bitstring, wherein the higher sum positions may be designated as a "1" and the lowest may be assigned a "0." As a further presumption, co-occurring propositions can share a higher than average number of bit values, 1 or 0, in identical positions, than non co-occurring propositions.

Figure 6:
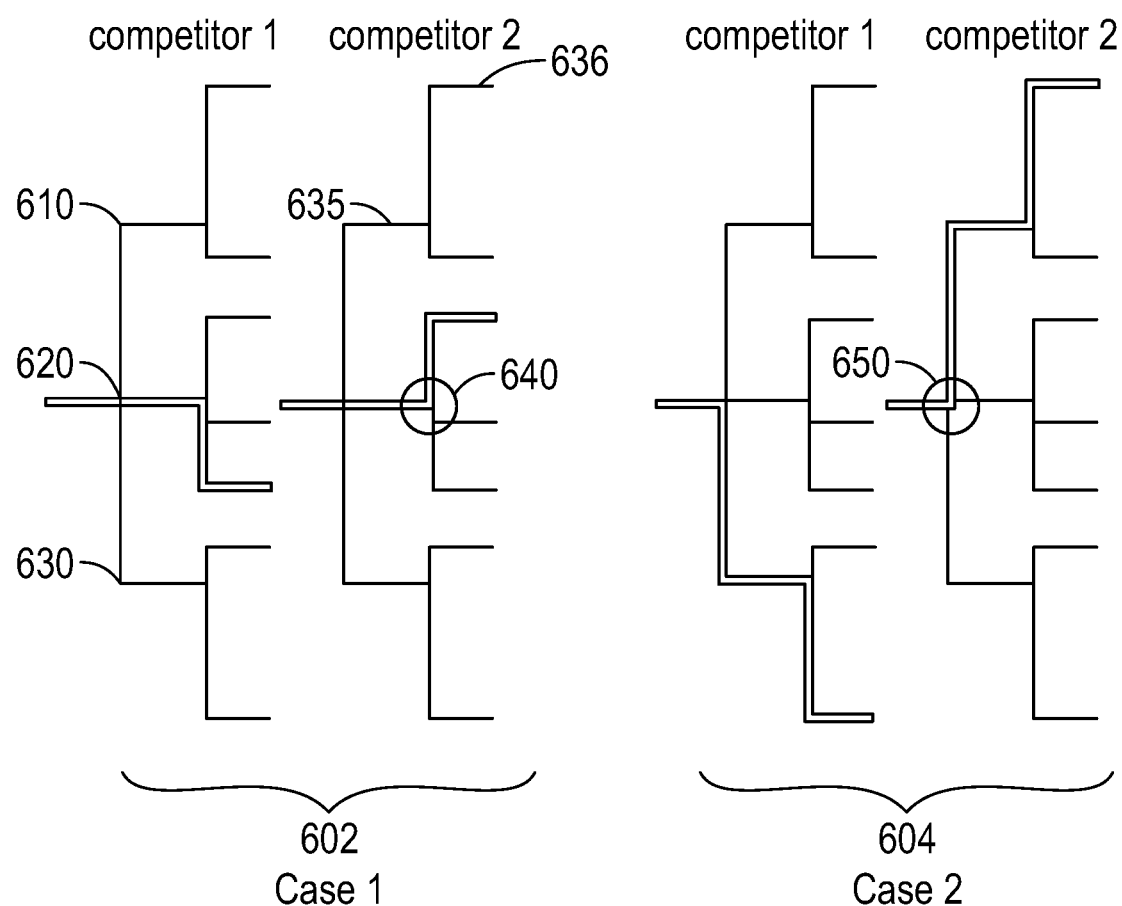
FIG. 6 is a search diagram representing a setup for simulation, in accordance with some embodiments.

Referring now to FIG. 6, a search diagram representing a setup for simulation in accordance with some embodiments is illustrated. According to a first example, three first level action alternatives are shown as 610, 620, and 630 for the first competing action option considered in case 1, 602. The possibilities of each respective first action are simulated, as exemplified by paths 635 and 636. These paths represent consecutive actions, which correspond to a depth of one and two, where depth is referring to which consecutive choice that has been introduced in the search. In both cases, 602 and 604, two simulation lines are compared to each other as notated by the bold paths. Consequently, the use of rating cells updates can be implemented. Each action option can be cached respective of its rating value, wherein the first time the action is encountered, its cache value may be calculated. This dual-line simulation approach gives two end options that are ideally comparable with regard to success. That is, when one line wins, the other loses. In the first case (602), the bifurcation between the two competing lines appears at action depth two (640); while in the second case (604), the bifurcation appears at action depth one (650). In operation, such cases may be repeated in a loop millions of times. If each case chooses action alternatives according to a calculated probability, the underlying, cached rating can be updated, pair by pair, in the position of bifurcation, so that new simulation will be done with updated probability for different actions. At the end, the action depth can be accurately updated. Further, simulations can be implemented to accumulate fundamental information for extended conditions 560 or situation bitstrings 570 of FIG. 5. During the learning mode, simulations can be implemented using a similarity matrix. Similarly, during the execution and simulation modes, simulations can be implemented using a similarity matrix.

Figure 7:
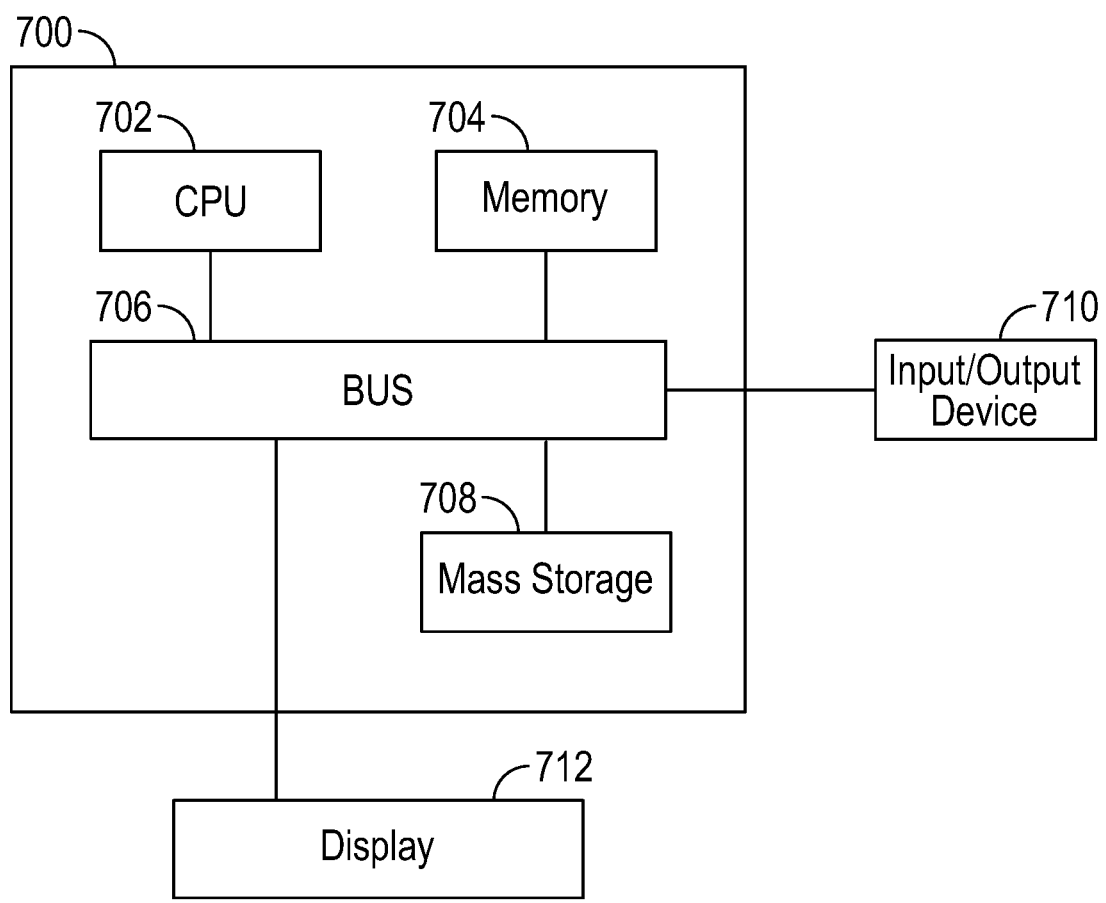
FIG. 7 is a block diagram of an exemplary computing system capable of implementing one or more of the embodiments described and/or illustrated herein.

It should be appreciated that the methods described herein may be performed with a digital processing system, such as a conventional, general-purpose computer system. Special purpose computers, which are designed or programmed to perform only one function may be used in the alternative. FIG. 7 is an illustration showing an exemplary computing device 700, which may implement the embodiments described herein. The computing device of FIG. 7 may be used to perform embodiments of the functionality for performing the cryptography having key agreement in accordance with some embodiments. The computing device includes a central processing unit (CPU) 702, which is coupled through a bus 706 to a memory 704, and mass storage device 708. Mass storage device 708 represents a persistent data storage device such as a floppy disc drive or a fixed disc drive, which may be local or remote in some embodiments. The mass storage device 708 could implement a backup storage, in some embodiments. Memory 704 may include read only memory, random access memory, etc. Applications resident on the computing device may be stored on or accessed through a computer readable medium such as memory 704 or mass storage device 708 in some embodiments. Applications may also be in the form of modulated electronic signals modulated accessed through a network modem or other network interface of the computing device. It should be appreciated that CPU 702 may be embodied in a general-purpose processor, a special purpose processor, or a specially programmed logic device in some embodiments.

Display 712 is in communication with CPU 702, memory 704, and mass storage device 708, through bus 706. Display 712 is configured to display any visualization tools or reports associated with the system described herein. Input/output device 710 is coupled to bus 706 in order to communicate information in command selections to CPU 702. It should be appreciated that data to and from external devices may be communicated through the input/output device 710. CPU 702 can be defined to execute the functionality described herein to enable the functionality described with reference to FIGS. 1-6. The code embodying this functionality may be stored within memory 704 or mass storage device 708 for execution by a processor such as CPU 702 in some embodiments. The operating system on the computing device may be iOS™, MS-WINDOWS™, OS/2™, UNIX™, LINUX™, or other known operating systems. It should be appreciated that the embodiments described herein may be integrated with virtualized computing system as well.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items. As used herein, the singular forms "a", "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, flash memory devices, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to so connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware; for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of data processing for an adaptive data processing system having complex dynamics performed by a processor-based adaptive action prediction module, comprising:

training an Artificial Neural Network (ANN) using a plurality of inputs;

selecting, by a processor based algorithmic/rule-set data processing unit, two or more predictive algorithmic/rule-sets;

initiating, by a ranking unit within a learning module of the processor-based adaptive action prediction module, a rating cell for each proposition associated with the two or more predictive algorithmic/rule-sets;

retrieving, by an applied model generator of the processor-based adaptive action prediction module, an atomized model from a storage unit;

applying, the trained ANN and the two or more predictive algorithmic/rule-sets to the atomized model to generate two or more applied data models;

retrieving, by a pattern comparison module within the learning module, inputs from the applied model generator;

processing, by the learning module, the two or more propositions during a learning mode based upon detection of an absolute pattern within the two or more applied data models;

processing, by an execution module within the processor-based adaptive action prediction module, the two or more propositions during an execution mode based upon detection of an absolute condition within the two or more applied data models;

updating, by the ranking unit, the plurality of rating cells, wherein the updating is based upon the detected patterns during the learning mode and based upon the detected conditions during the execution mode;

updating, by the applied model generator in communication with the execution module, the atomized model based upon the updated rating cells; and applying the trained ANN to the updated atomized model to generate an updated applied data model.

2. The method of claim 1, wherein the processing of propositions during the learning mode comprises:

detecting whether an absolute pattern exists within the inputs relative to the applied data model;

retrieving one or more propositions associated with the detected absolute pattern; and updating each rating cell corresponding to the retrieved one or more propositions.

3. The method of claim 1, wherein the processing of propositions during the execution mode comprises:

detecting of absolute conditions, wherein the processing of propositions are detected to determine whether absolute conditions are satisfied;

searching, in response to the detected absolute conditions, for a plurality of post patterns;

co-weighting two or more propositions, in response to detected post patterns, based upon a standing of at least one associated rating cell; and determining a likelihood of a win, for a first proposition winning against one or more propositions.

4. The method of claim 3, further comprising:

generating, in response to no detected post pattern, a predetermined pattern having a rating value corresponding to a probability of ½ to win against any average opposing proposition.

5. The method of claim 3, wherein the likelihood of a win comprises:

calculating the probability of the first proposition winning against a second proposition, ($p_{A\ win}$) is:

$$p_{A\,win} = \frac{r_A * (1 - r_B)}{r_A * (1 - r_B) + r_{AB} * (1 - r_A)},$$

where, $r_A$ is the probability of A winning against an average opponent algorithm and $r_B$ is the probability of B winning against an average opponent algorithm.

6. The method of claim 3, the likelihood of a win comprises:

calculating the probability of the first proposition winning against N propositions, ($p_{A\ win}$) is:

$$p_{A\,Win} = \frac{r_k \prod_{\substack{i=1 \\ i \neq k}}^{n}(1 - r_i)}{\sum_{j=1}^{N} r_j \prod_{\substack{i=1 \\ i \neq j}}^{n}(1 - r_i)},$$

where r is the estimated probability rating (r) for winning; i represents the index of losing opponents associated with a series from 0–n, j represents the indexes of the opponents of associated with a series from 0–m, with ri and rj representing their respective ratings at the points in competition; k is the index of the winning proposition; n is the number associated with each proposition and N is the maximum number of all propositions being considered.

7. The method of claim 3, wherein the detecting of absolute conditions comprises:

translating a set of differing conditions into a set of bit flags;

activating flags associated with fulfilled conditions; and deactivating flags associated with non-fulfilled conditions.

8. An adaptive data processing system, having complex dynamics performed by a processor-based adaptive action prediction module, comprising: a memory; and a processor operable to:

train an Artificial Neural Network (ANN) using a plurality of inputs;

select, by a processor based algorithmic/rule-set data processing unit, two or more predictive algorithmic/rule-sets;

initiate, by a ranking unit within a learning module of the processor-based adaptive action prediction module, a rating cell for each proposition associated with the two or more predictive algorithmic/rule-sets;

retrieve, by an applied model generator of the processor-based adaptive action prediction module, an atomized model from a storage unit; apply, the trained ANN and the two or more predictive algorithmic/rule-sets to the atomized model to generate two or more applied data models;

retrieve, by a pattern comparison module within the learning module, inputs from the applied model generator; process, by the learning module, the two or more propositions during a learning mode based upon detection of an absolute pattern within the two or more applied data models;

process, by an execution module within the processor-based adaptive action prediction module, the two or more propositions during an execution mode based upon detection of an absolute condition within the two or more applied data models;

update, by the ranking unit, the plurality of rating cells, wherein the updating is based upon the detected patterns during the learning mode and based upon the detected conditions during the execution mode;

update, by the applied model generator in communication with the execution module, the atomized model based upon the updated rating cells; and applying the trained ANN to the updated atomized model to generate an updated applied data model.

9. The data processing system of claim 8, wherein the processor, for processing of propositions during the learning mode operable to:
  detect whether an absolute pattern exists within the inputs relative to the applied data model;
  retrieve one or more propositions associated with the detected absolute pattern; and
  update each rating cell corresponding to the retrieved one or more propositions.

10. The data processing system of claim 8, wherein the processor, for processing of propositions during the execution mode, operable to:
  detect whether absolute conditions are satisfied;
  search, in response to the detected absolute conditions, for post patterns;
  co-weight two or more propositions based upon a standing of at least one associated rating cell; and
  determine a likelihood of a win, for a first proposition winning against one or more propositions.

11. The data processing system of claim 10, wherein the processor further operable to:
  generate, in response to no detected post pattern, a predetermined pattern having a rating value corresponding to a probability of ½ to win against any average opposing proposition.

12. The data processing system of claim 10, wherein the processor for determining likelihood of a win operable to:
  calculate the probability of the first proposition winning against a second proposition, ($p_{A\,win}$) is:

$$p_{A\,win} = \frac{r_A * (1 - r_B)}{r_A * (1 - r_B) + r_{AB} * (1 - r_A)},$$

where, $r_A$ is the probability of A winning against an average opponent algorithm and $r_B$ is the probability of B winning against an average opponent algorithm.

13. The data processing system of claim 10, wherein processor for determining likelihood of a win operable to:
  calculate the probability of the first proposition winning against N propositions, ($p_{A\,win}$) is:

$$p_{k\,Win} = \frac{r_k \prod_{\substack{i=1 \\ i \neq k}}^{n} (1 - r_i)}{\sum_{j=1}^{N} r_j \prod_{\substack{i=1 \\ i \neq j}}^{n} (1 - r_i)},$$

where r is the estimated probability rating (r) for winning; i represents the index of losing opponents associated with a series from 0–n, j represents the indexes of the opponents of associated with a series from 0–m, with ri and rj representing their respective ratings at the points in competition; k is the index of the winning proposition, n is the number associated with each proposition, and N is the maximum number of all propositions being considered.

14. A non-transitory computer-readable medium including code for performing a method of data processing for an adaptive data processing system having complex dynamics performed by a processor-based adaptive action prediction module, the method comprising:
  training an Artificial Neural Network (ANN) using a plurality of inputs;
  selecting, by a processor based algorithmic/rule-set data processing unit, two or more predictive algorithmic/rule-sets; initiating, by a ranking unit within a learning module of the processor-based adaptive action prediction module, a rating cell for each proposition associated with the two or more predictive algorithmic/rule-sets;
  retrieving, by an applied model generator of the processor-based adaptive action prediction module, an atomized model from a storage unit; applying, the trained ANN and the two or more predictive algorithmic/rule-sets to the atomized model to generate two or more applied data models;
  retrieving, by a pattern comparison module within the learning module, inputs from the applied model generator;
  processing, by the learning module, the two or more propositions during a learning mode based upon detection of an absolute pattern within the two or more applied data models;
  processing, by an execution module within the processor-based adaptive action prediction module, the two or more propositions during an execution mode based upon detection of an absolute condition within the two or more applied data models;
  updating, by the ranking unit, the plurality of rating cells, wherein the updating is based upon the detected patterns during the learning mode and based upon the detected conditions during the execution mode;
  updating, by the applied model generator in communication with the execution module, the atomized model based upon the updated rating cells; and
  applying the trained ANN to the updated atomized model to generate an updated applied data model.

15. The computer-readable medium of claim 14, wherein the processing of propositions during the learning mode comprises:
  detecting whether an absolute pattern exists within the inputs relative to the applied data model;
  retrieving one or more propositions associated with the detected absolute pattern; and updating each rating cell corresponding to the retrieved one or more propositions.

16. The computer-readable medium of claim 14, wherein the processing of propositions during the execution mode comprises:
    detecting of absolute conditions, wherein the processing of propositions are detected to determine whether absolute conditions are satisfied;
    searching, in response to the detected absolute conditions, for post patterns;
    co-weighting two or more propositions, in response to detected post patterns, based upon a standing of at least one associated rating cell; and
    determining a likelihood of a win, for a first proposition winning against one or more propositions.

17. The computer-readable medium of claim 16, further comprising:
    generating, in response to no detected post pattern, a predetermined pattern having a rating value corresponding to a probability of ½ to win against any average opposing proposition.

18. The computer-readable medium of claim 16, wherein determining the likelihood of a win comprises:
    calculating the probability of the first proposition winning against a second proposition, ($p_{A\ win}$) is:

$$p_{A\,win} = \frac{r_A * (1 - r_B)}{r_A * (1 - r_B) + r_{AB} * (1 - r_A)},$$

where, $r_A$ is the probability of A winning against an average opponent algorithm and $r_B$ is the probability of B winning against an average opponent algorithm.

19. The computer-readable medium of claim 16, wherein determining the likelihood of a win comprises:
    calculating the probability of the first proposition winning against N propositions, ($p_{A\ win}$) is:

$$p_{A\,Win} = \frac{r_k \prod_{\substack{i=1 \\ i \neq k}}^{n}(1 - r_i)}{\sum_{j=1}^{N} r_j \prod_{\substack{i=1 \\ i \neq j}}^{n}(1 - r_i)},$$

where r is the estimated probability rating (r) for winning; i represents the index of losing opponents associated with a series from 0–n, j represents the indexes of the opponents of associated with a series from 0–m, with ri and rj representing their respective ratings at the points in competition; k is the index of the winning proposition; n is the number associated with each proposition and N is the maximum number of all propositions being considered.

20. The computer-readable medium of claim 14, wherein the detecting of absolute conditions comprises:
    translating a set of differing conditions into a set of bit flags;
    activating flags associated with fulfilled conditions; and
    deactivating flags associated with non-fulfilled conditions.

* * * * *